Oct. 20, 1959  M. MEREDICH  2,909,385
GARDEN TOOL
Filed July 5, 1957
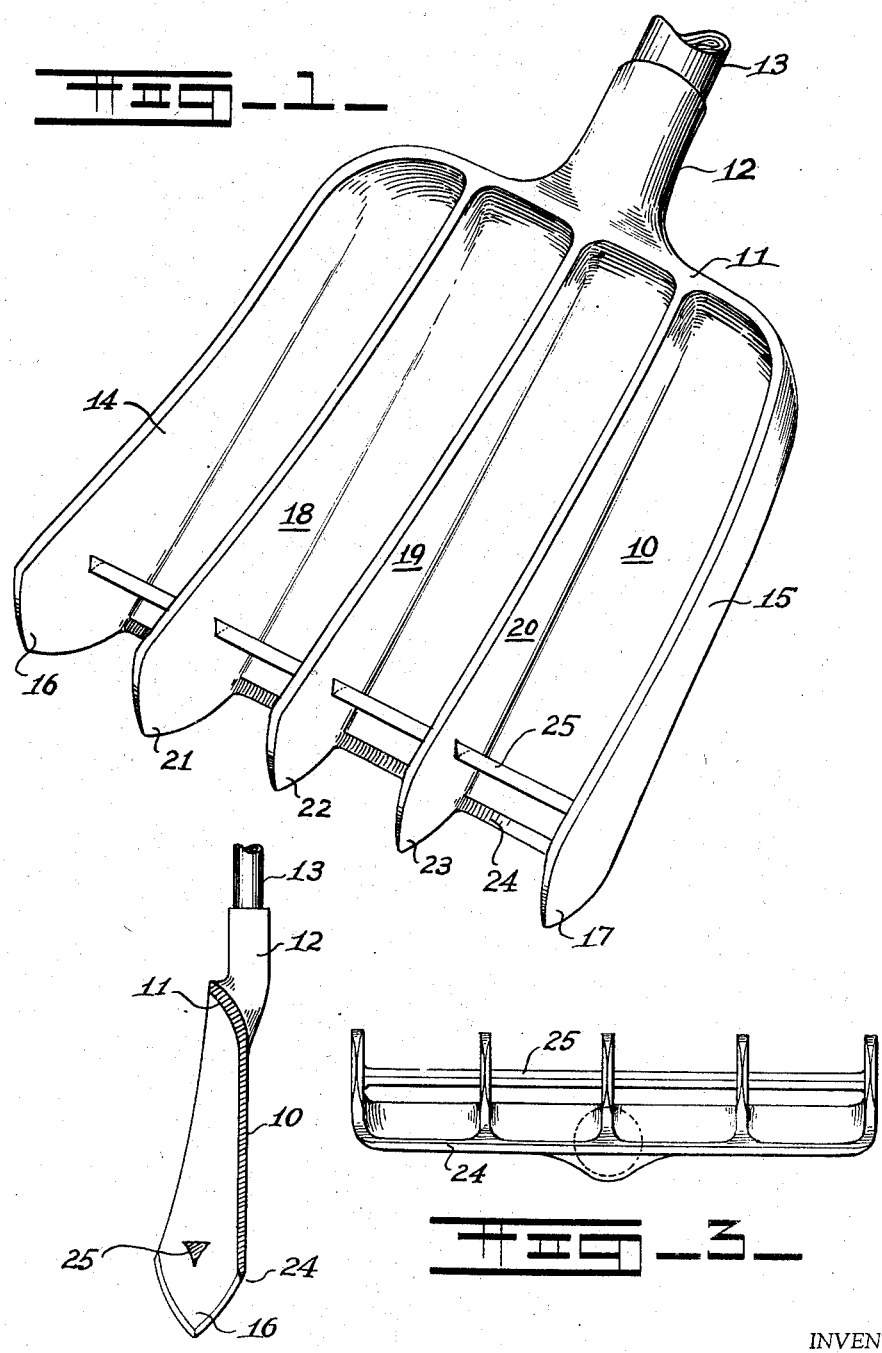
INVENTOR.
Mike Meredich
BY
W. B. Harpman
ATTORNEY.

United States Patent Office 2,909,385
Patented Oct. 20, 1959

2,909,385

GARDEN TOOL

Mike Meredich, Youngstown, Ohio

Application July 5, 1957, Serial No. 670,340

3 Claims. (Cl. 294—49)

This invention relates to a garden tool and more particularly to a spade-like tool which will break up earth as the tool is used.

The principal object of the invention is the provision of a spade-like garden tool which will divide earth being spaded therewith into a plurality of small sections to effectively break up the earth.

A further object of the invention is the provision of a spade-like garden tool with a plurality of cutting members arranged at right angles to one another and in spaced parallel relation to one another.

A still further object of the invention is the provision of a spade-like garden tool which may be used to break up clods and chunks of earth as well as to spade earth and simultaneously divide the same into a plurality of small pieces.

The garden tool disclosed herein comprises an improvement in the art relating to spade-like digging and earth-breaking devices. In spading a garden it is desirable to not only pick up the earth and turn it over, but to break it up into finely divided soil.

Spades and other tools heretofore known were effective in picking up the earth but ineffective in breaking it up.

The present tool provides a plurality of spaced parallel knife-like blades for dividing the earth as it is picked up both in the direction in which the spade is moved as in a spading earth, picking up motion, and also in lines transversely thereof so that the soil is reduced to fine pieces simultaneously with the picking up action.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a perspective view of the garden tool with the handle thereof broken away.

Figure 2 is a vertical section through the garden tool with parts in cross section and parts broken away.

Figure 3 is an end elevation of the outer or bottom end of the garden tool.

By referring to the drawing and Figure 1 in particular it will be seen that the garden tool comprises a substantially rectangular body 10 having an upwardly and outwardly curving upper end portion 11 which is joined directly to a handle receiving socket portion 12. A handle 13 is secured in the socket portion 12 and provides means by which the garden tool may be manipulated.

The outer parallel sides of the rectangular body 10 are each provided with upstanding side sections 14 and 15 which progressively increase in height from the upper end 11 of the tool to the opposite lower or outer end of the tool and the end portions 16 and 17 of which are pointed and knife-edged, as best shown in Figure 2 of the drawing.

A plurality of secondary upstanding elongated blade sections 18, 19 and 20 are positioned on the rectangular body member 10 in spaced parallel relation to one another and to the side sections 14 and 15 heretofore referred to. Each of the elongated blade sections 18, 19 and 20 is of a size and shape comparable with the side sections 16 and 17 and each is provided with knife-edged points 21, 22 and 23, respectively, on their outermost and/or lowermost ends.

The pointed knife-like end portions 16, 17, 21, 22 and 23 all extend outwardly beyond the lower or outward end of the rectangular body member which is also knife-edged as indicated at 24. The several upstanding elongated blade sections 18, 19 and 20 and the side sections 14 and 15 are joined to one another by a transversely extending cross sectionally triangular knife blade 25. The ends of the knife blade 25 are secured to the inner opposed surfaces of the side sections 14 and 15 and extend through apertures in the elongated blades 18, 19 and 20 and are secured thereto so as to hold the same in rigid spaced relation to one another. The knife blade 25 is spaced with respect to the rectangular body member 10 and is thereby positioned on a spaced parallel plane inwardly with respect to the knife-edged body member 24 thereof.

It will occur to those skilled in the art that the garden tool disclosed herein may be formed of a plurality of sections welded or otherwise secured to one another or, alternately, may be cast or forged in a unitary shape and that in either instance the resulting garden tool will effectively meet the several objects of the invention.

Those skilled in the art will also observe that the action of the garden tool disclosed herein is primarily that of a spade and secondly that of a cutting or chopping hoe, the novel formation enabling the tool to achieve the desired results simultaneously. Earth spaded with the tool is divided initially by the knife-like pointed ends of the side sections 14 and 15 and the elongated blade members 18, 19 and 20. Following such initial division as the tool is moved into the earth, the edge 24 of the body member 10 engages the earth and severs it in the manner of a spade and subsequently thereto the triangular blade 25 severs it transversely of the cut and at right angles to the elongated blade members 18, 19 and 20 and thereby breaks up the soil as desired.

It will thus be seen that the several objects of the invention are met by the garden tool disclosed herein.

Having thus described my invention, what I claim is:

1. A garden tool comprising a rectangular body member having upturned flanges on the sides and one end thereof, a handle receiving socket on said flanged end, said rectangular body member having a sharpened leading edge and a plurality of spaced elongated blade like members positioned on said rectangular body member at right angles thereto between and parallel with said side flanges, each of said blade like members having sharpened leading edges, a cross sectionally triangular knife blade adjacent the leading edges of said side flanges and said blade like members extending between said side flanges through said blade like members in spaced relation to said rectangular body member.

2. The garden tool set forth in claim 1 and wherein the side flanges and the elongated blade like members have pointed outermost ends defining said leading edges and extending beyond said leading edge of said rectangular body member.

3. The garden tool set forth in claim 1 and wherein the side flanges and the blade like members are of progressively increasing heighth from the flanged end of said rectangular body member adjacent said handle receiving socket to the opposite end of said body member and have their sharpened ends extending beyond the leading edge of said rectangular body member.

References Cited in the file of this patent

UNITED STATES PATENTS

| | | |
|---|---|---|
| 454,120 | Brunton | June 16, 1891 |
| 624,661 | Lay | May 9, 1899 |
| 716,045 | Huske | Dec. 16, 1902 |
| 1,642,985 | Beebe | Sept. 20, 1927 |

FOREIGN PATENTS

| | | |
|---|---|---|
| 53,846 | Norway | Apr. 23, 1934 |